United States Patent
Tang et al.

(10) Patent No.: US 9,734,539 B2
(45) Date of Patent: Aug. 15, 2017

(54) COORDINATED COIL SCHEDULING METHOD OF MULTIPLE PRODUCTION LINES FOR COLD ROLLING AREA IN STEEL PLANT

(71) Applicant: NORTHEASTERN UNIVERSITY, Shenyang (CN)

(72) Inventors: Lixin Tang, Shenyang (CN); Yang Yang, Shenyang (CN); Shengnan Zhao, Shenyang (CN)

(73) Assignee: NORTHEASTERN UNIVERSITY, Shenyang (CN)

( * ) Notice: Subject to any disclaimer, the term of this patent is extended or adjusted under 35 U.S.C. 154(b) by 0 days.

(21) Appl. No.: 14/582,061

(22) Filed: Dec. 23, 2014

(65) Prior Publication Data
US 2016/0155204 A1    Jun. 2, 2016

(30) Foreign Application Priority Data
Nov. 27, 2014    (CN) .......................... 2014 1 0705831

(51) Int. Cl.
*G06Q 10/00*     (2012.01)
*G06Q 50/04*     (2012.01)
*G06Q 10/06*     (2012.01)

(52) U.S. Cl.
CPC ....... *G06Q 50/04* (2013.01); *G06Q 10/06314* (2013.01); *Y02P 90/30* (2015.11)

(58) Field of Classification Search
CPC .......................... G06Q 10/06314; G06Q 50/04
(Continued)

(56) References Cited

U.S. PATENT DOCUMENTS 2,566,767 A * 9/1951 Hunt .................... G01R 31/013
                                                         209/570
6,044,361 A * 3/2000 Kalagnanam .......... G06Q 10/04
                                                         705/28
(Continued)

OTHER PUBLICATIONS

Tang, Lixin, Jiyin Liu, Aiying Rong, and Zihou Yang. "A review of planning and scheduling systems and methods for integrated steel production." European Journal of Operational Research 133, No. 1 (2001): 1-20.*
(Continued)

*Primary Examiner* — Jonathan G Sterrett
*Assistant Examiner* — Mehmet Yesildag (57) ABSTRACT

The present invention provides a coordinated coil scheduling method of multiple production lines in cold rolling area in steel plant, comprising: acquiring the information about the candidate coils to be scheduled in each of the multiple production lines in cold rolling area; building a coordinated coil scheduling model of multiple lines; obtaining the initial coordinated coil schedule of multiple lines by using a heuristic algorithm; improving the initial coordinated coil schedule in real time; and sending the improved coordinated coil schedule to the ACS of each production line. In this method, besides different production technological requirements of each coil, the cohesion relationship of different production lines are taken into account to make material supply to each equipment reasonable, and the smooth production process of coils in each of the lines is guaranteed with the changeover minimized, such that the whole efficiency of the manufacturing process is improved.

4 Claims, 3 Drawing Sheets

(58) Field of Classification Search
USPC .............................................. 705/7.24, 7.26
See application file for complete search history.

(56) References Cited

U.S. PATENT DOCUMENTS

| | | | |
|---|---|---|---|
| 2006/0100727 A1* | 5/2006 | Dash ................ | G05B 19/41865 700/97 |
| 2006/0143030 A1* | 6/2006 | Wertheimer ........... | G06Q 10/04 700/99 |
| 2013/0268249 A1* | 10/2013 | Tang ..................... | G06Q 10/08 703/2 |

OTHER PUBLICATIONS

Wang, D. D., A. Kiet Tieu, F. G. De Boer, B. Ma, and Wy Daniel Yuen. "Toward a heuristic optimum design of rolling schedules for tandem cold rolling mills." Engineering Applications of Artificial Intelligence 13, No. 4 (2000): 397-406.*

* cited by examiner

COORDINATED COIL SCHEDULING METHOD OF MULTIPLE PRODUCTION LINES FOR COLD ROLLING AREA IN STEEL PLANT

TECHNICAL FIELD

The present invention belongs to the field of information technology for manufacturing in metallurgy and relates to the field of automation technology, and more specifically, to a coordinated coil scheduling method of multiple production lines in cold rolling area in steel plant.

BACKGROUND ART

Coordination scheduling of metal materials for multiple lines in cold rolling area is an important part in the production operations for metallurgic enterprises. The effectiveness of the coordinated schedule has directly relationship on the stability of equipments and the operation efficiency in the multiple production lines in cold rolling area, and, on the quality of the final product and the production cost.

Figure 1:
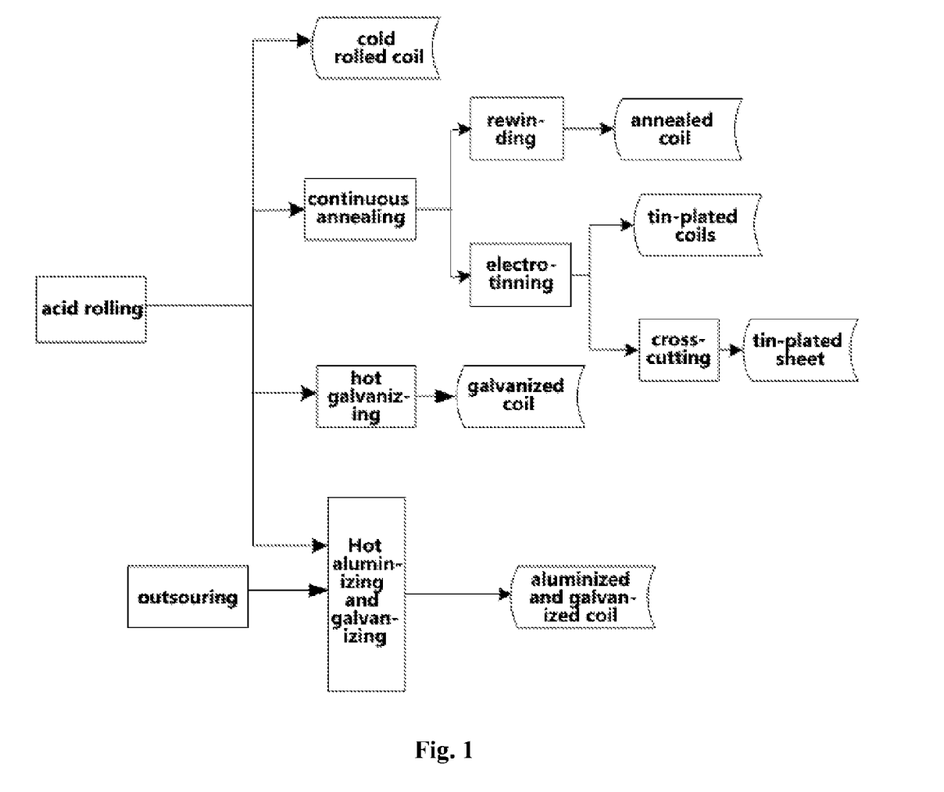
FIG. 1 illustrates the arrangement of lines in cold rolling area in steel plant in the embodiments of the present invention.

Taking the steel plant as an example, the cold rolling area comprises multiple production stages, such as, acid pickling, acid rolling, continuous annealing, hot galvanizing, hot galvanizing and aluminizing, finishing, electro-tinning, crosscutting, rewinding and etc. The hot rolled coils must pass the continuous acid pickling line to clean the iron oxide on the surface of the strip steel so as to perform cold rolling operation and the consequent surface processes smoothly. The hot rolled coils will be processed to be cold rolled coils in acid-rolling line, which can be directly sold, however, cold hardening caused by continuous cold deformation will lead to the increasing the strength and hardness of the coils and reducing the toughness, consequently, deteriorating the stamping characteristic. In order to improve the mechanical characteristic of the coils, the coils need to be annealed to softening the steel, smooth the surface, reduce the hardness, get a better resistance against deformation and crack, then a uniform distribution of structures and composites and a better performance of the material will achieve. In addition, the annealed coils also pass the electro-tinning or galvanizing line to form a firm, bright, compact, uniform and continuous alloy coating, which will realize good anti-corrosion and tarnish resistance characteristics. The tin-plated coils can be sold after being cut crossly according to the orders. FIG. 1 shows the arrangement of the respective production lines in the cold rolling area. The coordinated coil scheduling among multiple lines in cold rolling area has the features including multiple production lines arranged in parallel and in series concurrently, complex logistics, existence of both direct flows and cross flows simultaneously. Further, the coils are processed continuously in each production line, the processing of the coil cannot be started in the downstream production line until it is finished in the upstream production line, thus, the coil will be reprocessed or become wasted material, if its terrible defect incurred in the upstream production line is not be repaired in the downstream production line. Therefore, it must be guaranteed that the production in each production line is stably, and every product must be processed precisely in each line, so as to satisfy the customers' requirements. Reasonable coordinated coil schedule of multiple lines can equilibrate the production rhythm of the upstream and downstream of production lines in order to keep the production in each production line continuously and unblocked, reduce the changeover times, and keep the reasonable utilization of the production capacity and stably production in each production line.

Currently, the coil schedules in acid rolling, continuous annealing, hot galvanizing, hot galvanizing and aluminizing are made by the planner in each production line and the coordinated planner, in practice. The coordinated planner determines the production volume in each line per day, based on information such as the orders' requirements, the production capacity, the current state of lines and the coils in inventory etc. The planner in each production line determines the coil schedule based on the determined production volume in the lines each day. However, the practical production conditions are various, and often involve several decision makers, so that the current manual planning method could not effectively coordinate the production rhythms among the lines and determining the schedule with good performance, thus causing conflicts among the lines and increasing the changeover times, which couldn't guarantee the production stability and the quality of the product. On the other hand, the manual plan is strongly dependent on the personal experience of the planner, and the planner in each production line makes the coil schedule according to the scheduling requirements in the respective line. Each line may have different scheduling requirements to be taken into account thus causing conflicts between the coil schedules in different lines. If a coil schedule is made with only consideration of the scheduling requirements of a line, other lines may be negatively influenced and suffer from frequent changeover and material shortage, resulting in a high changeover costs. Therefore, it is important to determine the coil schedule for each production line in cold rolling area in a view of whole supply chain to coordinate coil schedules comprehensively, so as to optimize the overall production effect of all the lines in the cold rolling area.

SUMMARY OF INVENTION

In order to overcome the above mentioned drawbacks in the prior art, the present invention provides a coordinated coil scheduling method of multiple lines in cold rolling area in steel plant.

The technical solution of the present invention is:

a coordinated coil scheduling method of multiple lines in cold rolling area in steel plant, comprising:

Step 1: acquiring the information about the candidate coils to be scheduled for each of multiple production lines in the cold rolling area;

Step 2: building a coordinated coil scheduling model of multiple lines in cold rolling section in steel plant;

Step 2-1: according to production technological requirements of the production lines, calculating abrasion penalties and changeover penalties incurred by equipment adjustment due to different production requirements, comprising: abrasion penalties of equipment incurred by equipment adjustment due to different widths of two adjacent coils in a production line, abrasion penalties of equipment incurred by equipment adjustment due to different thicknesses of two adjacent coils in a production line, abrasion penalties of equipment incurred by equipment adjustment due to different surface requirements of two adjacent coils in a production line, abrasion penalties of equipment incurred by equipment adjustment due to different annealing temperatures of two adjacent coils in a production line, abrasion penalties of equipment incurred by equipment adjustment due to different weights of the surface plates of two coils in a production line, and abrasion penalties of equipment incurred by equipment adjustment due to different post-processing requirements of two coils in a production line;

Step 2-2: among the coil schedules corresponding to the production lines in the cold rolling supply chain composed by multiple production lines, an objective function of coordinated coil scheduling of multiple lines in the cold rolling area is built as minimizing the abrasion penalties and changeover penalties incurred by equipment adjustment due to different production requirements, $$\text{i.e., minimize} \sum_{k \in M} \sum_{j \in N_k} \sum_{i \in N_k} F_{ijk} x_{ijk};$$

where a decision variable of the objective function is represented as $x_{ijk}$, which indicates whether the coil i is processed immediately before the coil j, in the kth production line, if yes, the decision variable $x_{ijk}$ is assigned as 1, and if not, it is assigned as 0;

Step 2-3: constraints comprise the constraints for each of the multiple lines and the cohesion constraints among the production lines;

where the constraints for each of the multiple lines include: (1) for each of all actual coils, there must be exactly one coil being processed immediately before it; (2) for each of all the actual coils, there must be exactly one coil being processed immediately after it; (3) the changeover in width, thickness, surface requirement, and annealing temperature of the lines should not exceed the given upper limits; (4) it should be guaranteed that the determination to the processing time of the coils in each line will not incur idle time between any two adjacent processed coils; (5) for each of the coils, it should be processed exactly once in a production line along its required processing path;

where the cohesion constraints among the production lines imply the cohesion relationship between the production lines that the coil cannot be processed in a downstream production line until it is finished in the upstream production line;

Step 3: an initial coordinated coil schedule of multiple production lines in the cold rolling area is obtained by using heuristic algorithm, which includes an initial coil schedule in acid rolling line, an initial coil schedule in a continuous annealing line, an initial coil schedule in a hot galvanizing line, and an initial coil schedule in a hot aluminizing and galvanizing line;

Step 3-1: Determine the initial coil schedule in acid rolling line: an initial coil schedule in the acid rolling line is obtained by sequencing the coils to be processed in a descending order of the surface requirement code, and then sequencing the coils with the same surface requirement in a descending order of their widths, and then sequencing the coils with the same surface requirement and the same width in a descending order of their post-processing codes, and then sequencing the coils with the same surface requirement and the same width and the same post-processing code in an descending order of their annealing temperatures;

Step 3-2: calculating the starting time and the finishing time of each coil in the initial coil schedule in the acid rolling line;

Step 3-3: determine an initial coil schedule in the continuous annealing line: an initial annealing schedule of coils in the material inventory of continuous annealing line is obtained by sequencing the coils to be annealed in a descending order of their widths, and then sequencing the coils with the same width in a descending order of their annealing temperatures, and then sequencing the coils with the same width and the same annealing temperature in a descending order of their thicknesses, a coil schedule in continuous annealing line is obtained by selecting the coils to be annealed from the coil schedule in the acid rolling line, and sequentially inserting them after the initial annealing schedule of coils in the material inventory of continuous annealing line;

Step 3-4: determine an initial coil schedule in the hot galvanizing line: an initial schedule of the coils in the material inventory of hot galvanizing line is obtained, by sequencing the coils in the material inventory of hot galvanizing line in a descending order of their post-processing codes; and then sequencing the coils with the same post-processing code in a descending order of their widths; and then sequencing the coils with the same width and the same post-processing code in a descending order of their thicknesses; and then sequencing the coils with the same post-processing code, and the same width and the same thickness in a descending order of their annealing temperatures; an initial coil schedule in the hot galvanizing line is obtained by selecting the coils to be processed in hot galvanizing line from the initial coil schedule in acid rolling line, sequentially inserting them after the initial schedule of the coils in the material inventory of hot galvanizing line;

Step 3-5: determine an initial coil schedule in the hot aluminizing and galvanizing line: an initial schedule of coils in material inventory of the hot aluminizing and galvanizing line is obtained, by sequencing the coils in material inventory of the hot aluminizing and line galvanizing in a descending order of their post-processing codes; and then sequencing the coils with the same post-processing code in a descending order of their widths; and then sequencing the coils with the same post-processing code and the same width in a descending order of their thicknesses; and then sequencing the coils with the same post-processing code, the same width and the same thickness in a descending order of their annealing temperatures; an initial coil schedule in the hot aluminizing and galvanizing line is obtained, by selecting the coils to be processed in hot aluminizing and galvanizing line from the initial coil schedule in acid rolling line, sequentially inserting them after the initial schedule of coils in material inventory of the hot aluminizing and galvanizing line;

Step 3-6: calculating the starting time of each coil in the initial coil schedule in the continuous annealing line, the starting time of each coil in the initial coil schedule in the hot galvanizing line, and the starting time of each coil in the initial coil schedule in the hot galvanizing and aluminizing line;

Step 3-7: recording an initial coordinated coil schedule of multiple production lines in the cold rolling area, and calculating the objective function value corresponding to the initial coordinated coil schedule of multiple lines in the cold rolling area;

Step 4: improving in real time the initial coordinated coil schedule of multiple lines in the cold rolling area;

Step 5: sending the improved coordinated coil schedule of multiple lines in the cold rolling area to an automatic control systems (ACS) of each production lines in the cold rolling area, and realizing the coordinated coil scheduling of multiple lines in the cold rolling area.

the step 4 improves in real time the initial coordinated coil schedule of multiple lines in the cold rolling area, comprises the following steps:

Step 4-1: initializing population of the coordinated coil schedule of multiple lines in the cold rolling area, and setting a given maximum iteration number and a given maximum iteration number without improvement, population of the coordinated coil schedule of multiple lines in the cold rolling area comprises the initial coordinated coil schedule of multiple lines in the cold rolling area, and other coil schedules in the population of the coordinated coil schedule of multiple lines in the cold rolling area are generated randomly; and during the improvement, an adaptive value of each coordinated coil schedule is calculated according to the way for calculating the objective function of each coordinated coil schedule;

Step 4-2: judging whether the given maximum iteration number is reached, and if it is reached, then taking the schedule with the best adaptive value in the current population as the optimal schedule, that is, the improved coordinated coil schedule of multiple lines in the cold rolling area, and if not, go to step 4-3;

Step 4-3: judging whether the given maximum iteration number without improvement is reached, and if it is reached, then taking the schedule with the best adaptive value in the current population as the optimal schedule, that is, the improved coordinated coil schedule of multiple lines in the cold rolling area, and if not, go to step 4-4;

Step 4-4: if the individual with the best adaptive value in the population is not updated, the maximum iteration number without improvement is added by 1;

Step 4-5: performing a mutation operation to the population;

Step 4-6: performing a crossover operation to the population;

Step 4-7: performing a selecting operation on the son generation in the population;

Step 4-8: calculating the adaptive value for each individual in the population, that is, calculating the objective function value of coordinated coil schedule of multiple lines in the cold rolling area corresponding to the current population;

Step 4-9: performing an increment operation to the current iteration number and updating the population, and then returning to step 4-2.

The step 4-5 performs a mutation operation to the population, comprises the following:

$$V_i^t = X_a^{t-1} \oplus F \otimes (X_b^{t-1} - X_c^{t-1})$$

$$\Delta_i^t = F \otimes (X_b^{t-1} - X_c^{t-1}) \Leftrightarrow \delta_{ij}^t = \begin{cases} x_{bj}^{t-1} - x_{cj}^{t-1} & \text{if } rand() < F \\ 0 & \text{otherwise} \end{cases}$$

$$\Delta_i^t = (\delta_{i,0}^t, \delta_{i,1}^t, \ldots, \delta_{i,n}^t)$$

$$V_i^t = X_a^{t-1} \oplus \Delta_i^t \Leftrightarrow v_{ij}^t = x_{aj}^{t-1} \oplus \delta_{ij}^t = \mod((x_{aj}^{t-1} + \delta_{ij}^t + n), n)$$

where $V_i^t$ is the ith variant chromosome in the tth generation, and $v_{ij}^t$ is the jth individual in $V_i^t$, and $X_a^{t-1}$, $X_b^{t-1}$ and $X_c^{t-1}$ are three different coordinated coil schedules of multiple lines in the cold rolling area in the population of a t−1th generation, $x_{ij}^{t-1}$ is a jth individual in $X_i^{t-1}$, F is a scaling factor, $\Delta_i^t$ is the ith intermediate variant chromosome in the mutation process of the tth generation, $\delta_{ij}^t$ is a jth individual in the intermediate variant chromosome $\Delta_i^t$ in the mutation process of the tth generation, and mod means modulus.

Step 4-6 performs the crossover operation to the population, comprises the following:

generating a trial chromosome $U_i^t$, i=1, 2, . . . , PS, and $u_{ij}^t$ is an individual in the chromosome $U_i^t$;

$$u_{ij}^t = \begin{cases} v_{ij}^t & \text{if } rand() < CR \text{ or } j = D_j \\ x_{ij}^{t-1} & \text{otherwise} \end{cases}$$

where CR is in [0,1] which is the crossover parameter to ensure the variety of the s of the population, rand( ) generates a group of uniformly distributed randomly numbers between 0 and 1, $D_j$ is a number randomly selected from the set{1, 2, . . . , n}, so as to guarantee that at least one dimension of $U_i^t$ is different from the ith coordinated coil schedule of multiple lines in the cold rolling area in the t−1th generation $X_i^{t-1}$;

CR is a self-updating number as the iteration number increases, and is updated as follows:

$$CR = CR_{min} + t * \frac{(CR_{max} - CR_{min})}{T}$$

where $CR_{min}$ is a minimum crossover probability, $CR_{max}$ is a maximum crossover probability, t is the current iteration number, and T is a maximum iteration number.

Advantageous Effects (1) Not only different production technological requirements but also the cohesion relationship between different production lines in cold rolling area are taken in to account in the method of the present invention, so as to equilibrate material supply of the lines, and to guarantee a steady and smoothly production of coils in the lines and finally to improve the overall efficiency of the production in cold rolling area.

(2) Compared to manual production schedule, the total changeover times are reduced, and the frequency of equipment adjustment is reduced, thereby improving the quality of the product and production efficiency.

(3) Since there are similarities between the process in steel plant and that of production of other metals, the method of the present invention can be easily applied to production of other kinds of metals.

DETAILED DESCRIPTION OF THE EMBODIMENTS

The detailed description of the present invention is given here after with reference to the accompanied drawings.

The method of the present invention is implemented in a coordinated coil scheduling system of multiple lines in cold rolling area in steel plant, comprises at least one personal computer (PC), at least one electric cable interface/optic fiber interface/telephone line interface, and at least one router.

The PC is provided therein with a condition-setting module, an initial coordinated scheduling module and a real time improving module.

The condition-setting module is configured to set processing parameters of the processing environment in the lines in cold rolling area, and describe the details of the processes and determine the objective and constraints for adjustment of the processes.

The initial coordinated scheduling module is configured to sequence the coils based on the current supply of coils and obtain the initial coordinated coil schedule of multiple lines in cold rolling area.

The real time improving module improves the current coordinated coil schedule in real time and produces a better schedule.

The PC is configured to be connected to the front end of each of the lines in cold rolling area through a network and an internal server.

The electric cable interface/optical fiber interface/telephone line interface is configured for communications between the information management platform within the enterprise, the coordinated coil scheduling system of multiple lines in cold rolling area and the automatic control system in work site, for the purpose of optimizing the production process and improving the quality of product.

The software embedded in the PC includes a Windows operating system as a supporting platform, a Microsoft SQL Server 2000 database system supporting data management and configuring the information communicating ports.

The arrangement of lines in cold rolling area in steel plant in the embodiment is illustrated as in FIG. 1, including an acid rolling line, a continuous annealing line, a hot galvanizing line and a hot aluminizing and galvanizing line.

Figure 2:
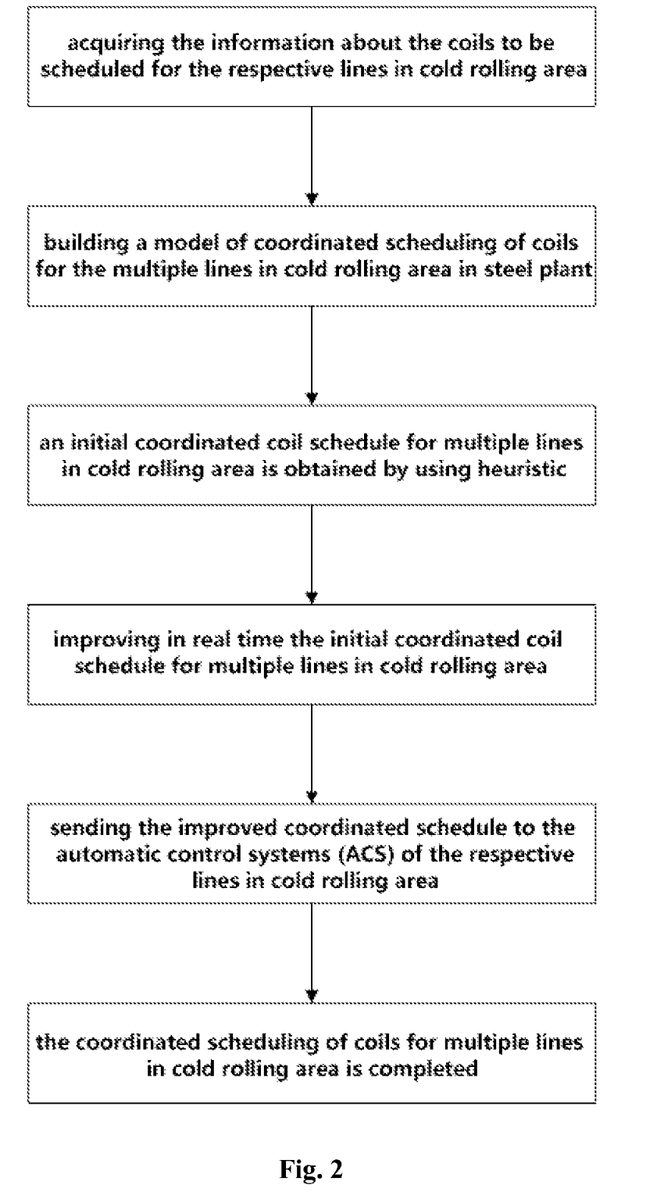
FIG. 2 illustrates the flowchart of coordinated coil scheduling method of multiple lines in cold rolling area in steel plant in the embodiments of the present invention.

A coordinated coil scheduling method of multiple lines in cold rolling area is illustrated as in FIG. 2, including the following steps:

Step 1: acquiring information about the coils to be scheduled for the lines in cold rolling area;

downloading data information about the coils from the ERP data server of the enterprise (involved fields including the coil number, the status of the material, width, thickness, actual weight, metallurgic specifications, specifications of product, the order number, the repairing type, the downstream lines, theoretical weight, the mark of the coil, stock, original stock, the steel grade, mother coil, production date, blocking reason, reason for surplus material, processing ways, due date, etc), so as to obtain the operating objects for the system and the scheduling method, at the same time, the information about the coil is added/deleted one-by-one according to current coil consumption in inventory and coil supply from the upstream lines, and the coil information is amended in order to confirm the coil information to be taken into account in the production scheduling; then proceeding into an automatic optimized scheduling stage. In the embodiment, the automatic optimized scheduling may be used for scheduling 16 coils in inventory.

TABLE 1

Information About Coils To Be Scheduled

| Coil No. | Surface requirement | Width (mm) | Thickness (mm) | Annealing Temperature | Post-processing | processing route | Located production line |
|---|---|---|---|---|---|---|---|
| 1 | 1 | 926 | 2 | 580 | — | Acid rolling -> Continuous annealing | Acid rolling |
| 2 | 1 | 860 | 2 | 580 | — | Acid rolling -> Continuous annealing | Acid rolling |
| 3 | 1 | 860 | 2 | 610 | — | Acid rolling -> Continuous annealing | Acid rolling |
| 4 | 1 | 937 | 2.5 | 620 | — | Acid rolling -> Continuous annealing | Acid rolling |
| 5 | 1 | 800 | 0.18 | 680 | — | Acid rolling -> Continuous annealing | Acid rolling |
| 6 | 1.2 | 800 | 0.18 | 620 | Anti-finger plating | Acid rolling -> hot galvanizing | Acid rolling |
| 7 | 1.2 | 800 | 0.18 | 650 | Anti-finger plating | Acid rolling -> hot galvanizing | Acid rolling |
| 8 | 1.2 | 896 | 0.18 | 580 | Phosphatization | Acid rolling -> hot aluminizing and galvanizing | Acid rolling |
| 9 | 1.2 | 896 | 0.18 | 620 | Phosphatization | Acid rolling -> hot aluminizing and galvanizing | Acid rolling |
| 10 | 0.5 | 896 | 0.18 | 620 | — | Acid rolling -> Continuous annealing | Continuous annealing |
| 11 | 0.5 | 896 | 0.18 | 680 | — | Acid rolling -> Continuous annealing | Continuous annealing |
| 12 | 0.5 | 896 | 0.18 | 620 | — | Acid rolling -> Continuous annealing | Continuous annealing |
| 13 | 0.5 | 1024 | 2.3 | — | — | Acid rolling -> Directly sale | Acid rolling |
| 14 | 0.5 | 1024 | 2.3 | — | — | Acid rolling -> Directly sale | Acid rolling |

TABLE 1-continued

Information About Coils To Be Scheduled

| Coil No. | Surface requirement | Width (mm) | Thickness (mm) | Annealing Temperature | Post-processing | processing route | Located production line |
|---|---|---|---|---|---|---|---|
| 15 | 0.5 | 1225 | 2.3 | — | — | Acid rolling -> Directly sale | Acid rolling |
| 16 | 0.5 | 1225 | 2.3 | — | — | Acid rolling -> Directly sale | Acid rolling |

Step 2: building a model for coordinated coil scheduling of multiple lines in cold rolling area in steel plant;

Step 2-1: according to production technological requirements of the production lines, calculating abrasion penalties and changeover penalties incurred by equipment adjustment due to different production requirements, comprising: abrasion penalties of equipment incurred by equipment adjustment due to different widths of two adjacent coils in a production line, abrasion penalties of equipment incurred by equipment adjustment due to different thicknesses of two adjacent coils in a production line, abrasion penalties of equipment incurred by equipment adjustment due to different surface requirements of two adjacent coils in a production line, abrasion penalties of equipment incurred by equipment adjustment due to different annealing temperatures of two adjacent coils in a production line, abrasion penalties of equipment incurred by equipment adjustment due to different weights of the surface plates of two coils in a production line, and abrasion penalties of equipment incurred by equipment adjustment due to different post-processing requirements of two coils in a production line;

(1) abrasion penalty $F_{ijk}^{w}$ of equipment incurred by equipment adjustment due to width changeover of coils i and j in line k:

$$F_{ijk}^{w}=K_{k}^{w}\cdot|w_{i}-w_{j}|, \ i, j \in N, k \in M \quad (1)$$

where N represents the set of all coils to be processed, $N=\{0, 1, \ldots, n, n+1\}$, and 0 and n+1 represent dummy coils, n represents the number of actual coils to be scheduled, M represents the set of all production lines, $M=\{0, \ldots, m-1\}$, m represents the number of the production lines, $K_{k}^{w}$ represents the unit weight of penalty incurred by width changeover on the kth line, and $w_i$ and $w_j$ represent the width of the coil i and the width of the coil j, respectively.

(2) abrasion penalty $F_{ijk}^{h}$ of equipment incurred by equipment adjustment due to thickness changeover of coils i and j in line k:

$$F_{ijk}^{h}=K_{k}^{h}\cdot|h_{i}-h_{j}|, \ i, j \in N, k \in M \quad (2)$$

where $K_{k}^{h}$ represents the unit weight of penalty incurred by thickness changeover in the kth line, and $h_i$ and $h_j$ represent the thickness of the coil i and the thickness of the coil j, respectively.

(3) abrasion penalty $F_{ijk}^{R}$ of equipment incurred by equipment adjustment due to surface requirement changeover of coils i and j in line k:

$$F_{ijk}^{R} = \begin{cases} K_{k}^{R1} & R_i \leq 1 \text{ and } R_j > 1 \\ K_{k}^{R2} & R_j \leq 1 \text{ and } R_i > 1 \end{cases}, \ i, j \in N, k \in M \quad (3)$$

where $K_{k}^{R1}$ and $K_{k}^{R2}$ represent the unit weight of penalty incurred by surface requirement changeover in the kth line, and $R_i$ and $R_j$ represent the surface requirement of the coil i and the surface requirement of the coil j, respectively.

(4) abrasion penalty $F_{ijk}^{t}$ of equipment incurred by equipment adjustment due to annealing temperature changeover of coils i and j in line k:

$$F_{ijk}^{t}=K_{k}^{t}\cdot|t_{i}-t_{j}|, \ i, j \in N, k \in M \quad (4)$$

where $K_{k}^{t}$ represents the unit weight of penalty incurred by annealing temperature changeover in the kth line, and $t_i$ and $t_j$ represent the annealing temperature of the coil i and the annealing temperature of the coil j, respectively.

(5) abrasion penalty $F_{ijk}^{wt}$ of equipment incurred by equipment adjustment due to weight changeover of the surface plates of coils i and j in line k $$F_{ijk}^{wt}=K_{k}^{wt}\cdot|wt_{i}-wt_{j}|, \ i, j \in N, k \in M \quad (5)$$

where $K_{k}^{wt}$ represents the unit weight of penalty incurred by weight changeover of the surface plates in the kth line, and $wt_i$ and $wt_j$ represent the weight changeover of the surface plates of coil i and coil j, respectively.

(6) abrasion penalty $F_{ijk}^{G}$ of equipment incurred by equipment adjustment due to post-processing changeover of coils i and j in line k $$F_{ijk}^{G} = \begin{cases} K_{k}^{G} & G_i \neq G_j \\ 0 & G_i = G_j \end{cases}, \ i, j \in N, k \in M \quad (6)$$

where $K_{k}^{G}$ represents the unit weight of penalty incurred by post-processing changeover in the kth line, and $G_i$ and $G_j$ represent the post-processing code of the coil i and the post-processing code of the coil j respectively.

(7) abrasion penalties and changeover penalties incurred by equipment adjustment due to different production requirements of coils i and j in each line, which is calculated in detail as follows:

The abrasion penalties and changeover penalties $F_{ij0}$ incurred by equipment adjustment due to different production requirements of coils i and j in the acid rolling line:

$$F_{ij0}=F_{ij0}^{w}+F_{ij0}^{h}+F_{ij0}^{R}i, \ j \in N \quad (7)$$

The abrasion penalties and changeover penalties $F_{ij1}$ incurred by equipment adjustment due to different production requirements of coils i and j in the continuous annealing line:

$$F_{ij1}=F_{ij1}^{w}+F_{ij1}^{h}+F_{ij1}^{t}i, \ j \in N \quad (8)$$

The abrasion penalties and changeover penalties $F_{ij2}$ incurred by equipment adjustment due to different production requirements of coils i and j in the hot galvanizing line:

$$F_{ij2}=F_{ij2}^{w}+F_{ij2}^{h}+F_{ij2}^{t}+F_{ij2}^{wt}+F_{ij2}^{G}i, \ j \in N \quad (9)$$

The abrasion penalties and changeover penalties $F_{ij3}$ incurred by equipment adjustment due to different production requirements of coils i and j on the hot aluminizing and galvanizing line:

$$F_{ij3}=F_{ij3}^{w}+F_{ij3}^{h}+F_{ij3}^{t}+F_{ij3}^{wt}+F_{ij3}^{G}i, \ j \in N \quad (10)$$

Step 2-2: among the coil schedules corresponding to the production lines in the cold rolling supply chain composed by multiple production lines, an objective function of coordinated coil scheduling of multiple lines in the cold rolling area is built as minimizing the abrasion penalties and changeover penalties incurred by equipment adjustment due to different production requirements:

$$\text{Minimize} \sum_{k \in M} \sum_{j \in N_k} \sum_{i \in N_k} F_{ijk} x_{ijk} \quad (11)$$

where the decision variable of the objective function is represented as $x_{ijk}$, which indicates whether the coil i is processed immediately before the coil j, in the kth production line, if yes, the decision variable $x_{ijk}$ is assigned as 1, and if not, it is assigned as 0;

Step 2-3: the constraints for the objective function comprise the constraints for each of the multiple lines and the cohesion constraints among the production lines.

The constraints of each of the multiple respective lines include: (1) for each of all the actual coils, there must be exactly one coil being processed immediately before it; (2) for each of all the actual coils, there must be exactly one coil being processed immediately after it; (3) the changeover in width, thickness, surface requirement, and annealing temperatures of the lines should not exceed the predetermined upper limits; (4) it should be guaranteed that the determination to the processing time of the coils in each line will not incur idle time between any two adjacent processed coils; (5) for each of the coils, it is only processed exactly once in a production line along its processing path;

(1) the constraints of each of the multiple production lines include:

1) for each of all the actual coils, there must be exactly one coil being processed immediately before it;

$$\sum_{i \in N_k \cup \{0\}} x_{ijk} = 1, \quad \forall j \in N_k, k \in M. \quad (12)$$

where $N_k$ represents the set of coils to be processed in line k.

2) for each of all the actual coils, there must be exactly one coil being processed immediately after it;

$$\sum_{j \in N_k \cup \{N+1\}} x_{ijk} = 1, \quad \forall i \in N_k, k \in M. \quad (13)$$

3) constraints for sequencing dummy coils, constraint (14) means that, there must be exactly one actual coil being processed immediately after the head dummy coil, and constraint (15) means that, there must be exactly one actual coil being processed immediately before the last dummy coil, $$\sum_{j \in N_k} x_{0,j,k} = 1, \forall k \in M. \quad (14)$$

$$\sum_{i \in N_k} x_{i,n+1,k} = 1, \forall k \in M. \quad (15)$$

where the dummy coils are used to indicate the beginning and finishing of each line.

4) the changeover in width, thickness, thicknesses of the surface plates and annealing temperatures of the lines should not exceed the predetermined upper limits:

$$|w_i - w_j| \times x_{ijk} \leq w_0, \forall i, j \in N, k \in M. \quad (16)$$

$$|h_i - h_j| \times x_{ijk} \leq h_0, \forall i, j \in N, k \in M. \quad (17)$$

$$|t_i - t_j| \times x_{ijk} \leq t_0, \forall i, j \in N, k \in M. \quad (18)$$

$$|wt_i - wt_j| \times x_{ijk} \leq wt_0, \forall i, j \in N, k \in M. \quad (19)$$

where $w_0$ is the predetermined upper limit of the width changeover, $h_0$ is the predetermined upper limit of the thickness changeover, $t_0$ is the predetermined upper limit of the annealing temperature changeover, and $wt_0$ is the predetermined upper limit of the thickness changeover of the surface plates;

5) it should be guaranteed that the determination to the processing time of the coils in each line will not incur idle time between any two adjacent processed coils;

$$C_{ik} = x_{0ik} p_{ik} + \sum_{j \in N_k} x_{jik} (C_{jk} + p_{ik}), \quad \forall i \in N_k, k \in M. \quad (20)$$

where $C_{ik}$ represents the completion time of the coil i in the kth line, and $p_{ik}$ represents the processing time of coil i in line k.

6) for each of the coils, it should be processed exactly once in a production line along its required processing path:

$$d_{jk} \geq (d_{ik}+1) - (1-x_{ijk}) \cdot (n+1), \forall i \in N_k \cup \{0\}, j \in N_k \cup \{n+1\}, k \in M. \quad (21)$$

$$d_{ik} \leq n+1, \forall i \in N_k \cup \{0, n+1\}, k \in M. \quad (22)$$

where $d_{ik}$ represents the processing position number of coil i in the coil schedule of line k.

7) constraints (19)~(23) are constraints for range of the variables.

$$x_{iik} = 0, \forall i \in N_k \cup \{0, n+1\}, k \in M. \quad (23)$$

$$x_{i0k} = 0, \forall i \in N_k \cup \{n+1\}, k \in M. \quad (24)$$

$$x_{n+1,i,k} = 0, \forall i \in N_k \cup \{0\}, k \in M. \quad (25)$$

$$x_{ijk} \in \{0,1\}, \forall i \in N_k \cup \{0\}, j \in N_k \cup \{n+1\}, k \in M. \quad (26)$$

$$C_{ik} \geq 0, \forall i \in N_k \cup \{0, n+1\}, k \in M. \quad (27)$$

The cohesion constraints among the production lines imply the cohesion relationship between the production lines for guaranteeing that the coil cannot be processed in a downstream production line until it is finished in the upstream production line;

$$C_{ik} \leq C_{ik'} - p_{ik'}, \forall i \in N_k, k \in M, k' \in L_k. \quad (28)$$

where $L_k$ represents the set of the downstream lines immediately following the line k.

Step 3: an initial coordinated coil schedule of multiple production lines in the cold rolling area is obtained by using heuristic algorithm, which includes an initial coil schedule in acid rolling line, an initial coil schedule in a continuous annealing line, an initial coil schedule in a hot galvanizing line, and an initial coil schedule in a hot aluminizing and galvanizing line;

Step 3-1: Determine the initial coil schedule in acid rolling line: an initial coil schedule in the acid rolling line is obtained by sequencing the coils to be processed in a descending order of the surface requirement code, and then sequencing the coils with the same surface requirement in a descending order of their widths, and then sequencing the coils with the same surface requirement and the same width in a descending order of their post-processing codes, and then sequencing the coils with the same surface requirement and the same width and the same post-processing code in an descending order of their annealing temperatures;

Step 3-2: calculating the starting time and the finishing time of each coil in the initial coil schedule in the acid rolling line;

Step 3-3: determine an initial coil schedule in the continuous annealing line: an initial annealing schedule of coils in the material inventory of continuous annealing line is obtained by sequencing the coils to be annealed in a descending order of their widths, and then sequencing the coils with the same width in a descending order of their annealing temperatures, and then sequencing the coils with the same width and the same annealing temperature in a descending order of their thicknesses, a coil schedule in continuous annealing line is obtained by selecting the coils to be annealed from the coil schedule in the acid rolling line, and sequentially inserting them after the initial annealing schedule of coils in the material inventory of continuous annealing line;

Step 3-4: determine an initial coil schedule in the hot galvanizing line: an initial schedule of the coils in the material inventory of hot galvanizing line is obtained, by sequencing the coils in the material inventory of hot galvanizing line in a descending order of their post-processing codes; and then sequencing the coils with the same post-processing code in a descending order of their widths; and then sequencing the coils with the same width and the same post-processing code in a descending order of their thicknesses; and then sequencing the coils with the same post-processing code, and the same width and the same thickness in a descending order of their annealing temperatures; an initial coil schedule in the hot galvanizing line is obtained by selecting the coils to be processed in hot galvanizing line from the initial coil schedule in acid rolling line, sequentially inserting them after the initial schedule of the coils in the material inventory of hot galvanizing line;

Step 3-5: determine an initial coil schedule in the hot aluminizing and galvanizing line: an initial schedule of coils in material inventory of the hot aluminizing and galvanizing line is obtained, by sequencing the coils in material inventory of the hot aluminizing and galvanizing line in a descending order of their post-processing codes; and then sequencing the coils with the same post-processing code in a descending order of their widths; and then sequencing the coils with the same post-processing code and the same width in a descending order of their thicknesses; and then sequencing the coils with the same post-processing code, the same width and the same thickness in a descending order of their annealing temperatures; an initial coil schedule in the hot aluminizing and galvanizing line is obtained, by selecting the coils to be processed in hot aluminizing and galvanizing line from the initial coil schedule in acid rolling line, sequentially inserting them after the initial schedule of coils in material inventory of the hot aluminizing and galvanizing line;

Step 3-6: calculating the starting time of each coil in the initial coil schedule in the continuous annealing line, the starting time of each coil in the initial coil schedule in the hot galvanizing line, and the starting time of each coil in the initial coil schedule in the hot aluminizing and galvanizing line;

Step 3-7: recording an initial coordinated coil schedule of multiple production lines in the cold rolling area, and calculating the objective function value corresponding to the initial coordinated coil schedule of multiple lines in the cold rolling area;

An initial coordinated coil schedule of multiple lines in cold rolling area is obtained as follows:

the coil schedule in acid rolling line: 8->9->6->7->4->1->2->3->5->15->16->13->14;

the coil schedule in continuous annealing line: 11->10->12->4->1->2->3->5;

the coil schedule in hot galvanizing line: 6->7 the coil schedule in hot aluminizing and galvanizing line: 8->9

Figure 3:
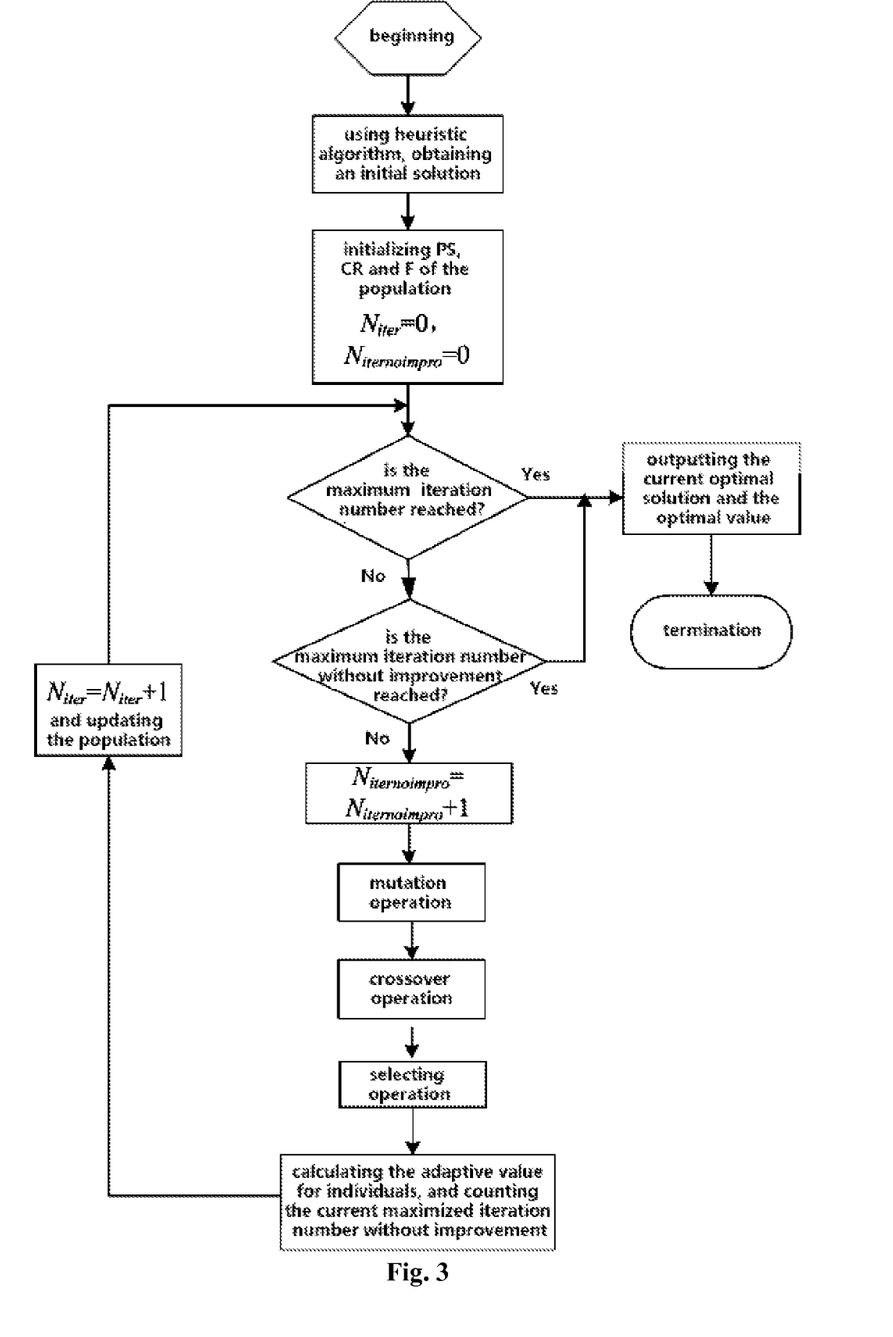
FIG. 3 illustrates the flowchart of real time improvement method for the initial coordinated coil schedule of multiple lines in cold rolling area in steel plant in the embodiments of the present invention.

Step 4: improving in real time the initial coordinated coil schedule of multiple lines in cold rolling area, as shown in FIG. 3;

Step 4 specifically comprises the following steps:

Step 4-1: initializing the population of the coordinated coil schedule of multiple lines in cold rolling area, and setting the given maximum iteration number $UN_{iter}$ and the given maximum iteration number without improvement $UN_{iternoimpro}$, population of the coordinated coil schedule of multiple lines in the cold rolling area comprises the initial coordinated coil schedule of multiple lines in the cold rolling area, and other coil schedules in the population of the coordinated coil schedule of multiple lines in the cold rolling area are generated randomly; and during the improvement, an adaptive value of each coordinated coil schedule is calculated according to the way for calculating the objective function of each coordinated coil schedule, and the calculation is in accordance with the equation (11);

Setting the crossover factor CR in a range of [0.1, 0.5], the scaling factor F is 0.7, the population size PS is 80, the given maximum iteration number is 300, and the given maximum iteration number without improvement is 50.

Step 4-2: judging whether the given maximum iteration number is reached, and if it is reached, then taking the schedule with the best adaptive value in the current population as the optimal schedule, that is, the improved coordinated coil schedule of multiple lines in the cold rolling area, and if not, go to step 4-3;

Step 4-3: judging whether the given maximum iteration number without improvement is reached, and if it is reached, then taking the schedule with the best adaptive value in the current population as the optimal schedule, that is, the improved coordinated coil schedule of multiple lines in the cold rolling area, and if not, go to step 4-4;

Step 4-4: if the individual with the best adaptive value in the population is not updated, then the maximum iteration number without improvement $N_{iternoimpro}=N_{iternoimpro}+1$.

Step 4-5: performing a mutation operation to the population, specifically as follows:

$$V_i^t = X_a^{t-1} \oplus F \otimes (X_b^{t-1} - X_c^{t-1}) \qquad (29)$$

$$\Delta_i^t = F \otimes (X_b^{t-1} - X_c^{t-1}) \Leftrightarrow \delta_{ij}^t = \begin{cases} x_{bj}^{t-1} - x_{cj}^{t-1} & \text{if } rand() < F \\ 0 & \text{otherwise} \end{cases} \qquad (30)$$

$$\Delta_i^t = (\delta_{i,0}^t, \delta_{i,1}^t, \ldots, \delta_{i,n}^t) \qquad (31)$$

$$V_i^t = X_a^{t-1} \oplus \Delta_i^t \Leftrightarrow v_{ij}^t = x_{aj}^{t-1} \oplus \delta_{ij}^t = \text{mod}((x_{aj}^{t-1} + \delta_{ij}^t + n), n) \qquad (32)$$

where $V_i^t$ is the ith variant chromosome in the tth generation, and $v_{ij}^t$ is the jth individual in the $V_i^t$, and $X_a^{t-1}$, $X_b^{t-1}$ and $X_c^{t-1}$ are three different coordinated coil schedules of multiple lines in cold rolling area in the population of the t−1th generation, $x_{ij}^{t-1}$ means the jth individual in the $X_i^{t-1}$, F means the scaling factor, $\Delta_i^t$ means the ith intermediate variant chromosome in the mutation process of the tth generation, $\delta_{ij}^t$ means the jth individual in the intermediate variant chromosome $\Delta_i^t$ in the mutation process of the tth generation, and mod means modulus.

Step 4-6: performing a crossover operation to the population, specifically as follows:

generating a trial chromosome $U_i^t$, i=1, 2, ..., PS, and $u_{ij}^t$ is an individual in the chromosome $U_i^t$;

$$u_{ij}^t = \begin{cases} v_{ij}^t & \text{if } rand() < CR \text{ or } j = D_j \\ x_{ij}^{t-1} & \text{otherwise} \end{cases} \quad (33)$$

where PS represents the number of chromosomes of the initial population, CR is in [0,1] and in order to ensure the variety of the population, rand( ) generates a group of uniformly distributed random numbers between 0 and 1, $D_j$ is a number randomly selected from the set{1, 2, ..., n}, so as to guarantee that at least one dimension of the $U_i^t$ is different from the ith coordinated coil schedule for the multiple lines in the cold rolling area in the t−1th generation $X_i^{t-1}$;

CR is an self-updating number as the iteration number increases, and is updated as follows:

$$CR = CR_{min} + t * \frac{(CR_{max} - CR_{min})}{T} \quad (34)$$

where $CR_{min}$ is the minimum crossover probability, $CR_{max}$ is the maximum crossover probability, t means the current iteration number, and T is the maximum iteration number.

Step 4-7: performing a selecting operation on the son generation in the population;

$$X_i^t = \begin{cases} U_i^t & \text{if } f(U_i^t) \le f(X_i^{t-1}) \\ X_i^{t-1} & \text{otherwise} \end{cases} \quad (35)$$

where f( ) is the calculating equation for adaptive value based on the objective function (11), and the equation (31) generates a new object chromosome finally;

Step 4-8: calculating an adaptive value for each individual in the population, that is, calculating the objective function value of coordinated coil schedule of multiple lines in cold rolling area corresponding to the current population;

Step 4-9: the current iteration number is increment $N_{iter} = N_{iter} + 1$ and the population is updated, and then return to step 4-2.

the improved coil schedule in acid rolling line: 8->9->6->7->4->2->3->1->5->15->16->14->13;

the improved coil schedule in continuous annealing line: 11->10->12->2->3->4->1->5 the improved coil schedule in hot galvanizing line: 6->7 the improved coil schedule in hot aluminizing and galvanizing line: 8->9

Step 5: sending the improved coordinated schedule to the ACS (automatic control system) of the respective lines in cold rolling area, and the coordinated coil scheduling of multiple lines in cold rolling area is completed.

The invention claimed is:

1. A coordinated coil scheduling method of multiple production lines in a cold rolling area in a steel plant, the production lines including an acid rolling line, a continuous annealing line, a hot galvanizing line, and a hot aluminizing and galvanizing line, the method comprising:

Step 1: acquiring information about candidate coils to be scheduled for each of multiple production lines in the cold rolling area;

Step 2: building a coordinated coil scheduling model of multiple production lines in the cold rolling area in the steel plant;

Step 2-1: according to production technological requirements of the production lines, calculating abrasion penalties and changeover penalties incurred by equipment adjustment due to different production requirements, comprising: abrasion penalties of equipment incurred by equipment adjustment due to different widths of two adjacent coils in a production line, abrasion penalties of equipment incurred by equipment adjustment due to different thicknesses of two adjacent coils in a production line, abrasion penalties of equipment incurred by equipment adjustment due to different surface requirements of two adjacent coils in a production line, abrasion penalties of equipment incurred by equipment adjustment due to different annealing temperatures of two adjacent coils in a production line, abrasion penalties of equipment incurred by equipment adjustment due to different weights of the surface plates of two coils in a production line, and abrasion penalties of equipment incurred by equipment adjustment due to different post-processing requirements of two coils in a production line;

Step 2-2: among coil schedules corresponding to the production lines in a cold rolling supply chain composed by multiple production lines, an objective function of coordinated coil scheduling of multiple lines in the cold rolling area is built as minimizing the abrasion penalties and changeover penalties incurred by equipment adjustment due to different production requirements, i.e., minimize $\sum_{k \in M} \sum_{j \in N_k} \sum_{i \in N_k} F_{ijk} x_{ijk}$;

where a decision variable of the objective function is represented as $x_{ijk}$, which indicates whether a coil i is processed immediately before a coil j, in a kth production line, if yes, the decision variable $x_{ijk}$ is assigned as 1, and if not, it is assigned as 0;

Step 2-3: constraints comprise ones for each of the multiple lines and cohesion constraints among the production lines;

where the constraints for each of the multiple lines include: (1) for each of all actual coils, there must be exactly one coil being processed immediately before it; (2) for each of all the actual coils, there must be exactly one coil being processed immediately after it; (3) changeover in width, thickness, surface requirement, and annealing temperature of lines should not exceed predetermined upper limits; (4) it should be guaranteed that determination to a processing time of coils in each line will not incur idle time between any two adjacent processed coils; (5) for each of the coils, it should be processed exactly once in a production line along its required processing path;

where the cohesion constraints among the production lines imply a cohesion relationship between the production lines that the coil cannot be processed in a downstream production line until it is finished in an upstream production line;

Step 3: an initial coordinated coil schedule of multiple production lines in the cold rolling area is obtained by using an heuristic algorithm, which includes an initial coil schedule in acid rolling line, an initial coil schedule in continuous annealing line, an initial coil schedule in hot galvanizing line, and an initial schedule of coils in hot aluminizing and galvanizing line;

Step 3-1: Determine the initial coil schedule in acid rolling line: an initial coil schedule in the acid rolling line is obtained by sequencing the coils to be processed in a descending order of a surface requirement code, and then sequencing the coils with a same surface requirement in a descending order of their widths, and then sequencing the coils with the same surface requirement and a same width in a descending order of their post-processing codes, and then sequencing the coils with the same surface requirement and the same width and a same post-processing code in an descending order of their annealing temperatures;

Step 3-2: calculating a starting time and a finishing time of each coil in the initial coil schedule in the acid rolling line;

Step 3-3: determine an initial coil schedule in a continuous annealing line: an initial annealing schedule of coils in a material inventory of continuous annealing line is obtained by sequencing the coils to be annealed in a descending order of their widths, and then sequencing the coils with the same width in a descending order of their annealing temperatures, and then sequencing the coils with the same width and a same annealing temperature in a descending order of their thicknesses, a coil schedule in continuous annealing line is obtained by selecting the coils to be annealed from the coil schedule in the acid rolling line, and sequentially inserting them after the initial annealing schedule of coils in the material inventory of continuous annealing line;

Step 3-4: determine an initial coil schedule in the hot galvanizing line: an initial schedule of the coils in the material inventory of hot galvanizing line is obtained, by sequencing the coils in the material inventory of hot galvanizing line in a descending order of their post-processing codes; and then sequencing the coils with the same post-processing code in a descending order of their widths; and then sequencing the coils with the same width and the same post-processing code in a descending order of their thicknesses; and then sequencing the coils with the same post-processing code, the same width and the same thickness in a descending order of their annealing temperatures; an initial coil schedule in the hot galvanizing line is obtained by selecting the coils to be processed in hot galvanizing line from the initial coil schedule in acid rolling line, sequentially inserting them after the initial schedule of the coils in the material inventory of hot galvanizing line;

Step 3-5: determine an initial schedule of coils in the hot galvanizing and aluminizing line: an initial schedule of coils in material inventory of the hot galvanizing and aluminizing line is obtained, by sequencing the coils in material inventory of the hot galvanizing and aluminizing line in a descending order of their post-processing codes; and then sequencing the coils with the same post-processing code in a descending order of their widths; and then sequencing the coils with the same post-processing code and the same width in a descending order of their thicknesses; and then sequencing the coils with the same post-processing code, the same width and the same thickness in a descending order of their annealing temperatures; an initial coil schedule in the hot galvanizing and aluminizing line is obtained, by selecting the coils to be processed in hot galvanizing and aluminizing line from the initial coil schedule in acid rolling line, sequentially inserting them after the initial schedule of coils in material inventory of the hot galvanizing and aluminizing line;

Step 3-6: calculating the starting time of each coil in the initial coil schedule in the continuous annealing line, the starting time of each coil in the initial coil schedule in the hot galvanizing line, and the starting time of each coil in the initial coil schedule in the hot aluminizing and galvanizing line;

Step 3-7: recording an initial coordinated coil schedule of multiple production lines in the cold rolling area, and calculating the objective function value corresponding to the initial coordinated coil schedule of multiple lines in the cold rolling area;

Step 4: improving in real time the initial coordinated coil schedule of multiple lines in the cold rolling area;

Step 5: sending the improved coordinated coil schedule of multiple lines in the cold rolling area to an automatic control systems (ACS) of each production lines in the cold rolling area, and realizing the coordinated coil scheduling of multiple lines in the cold rolling area, wherein realizing the coordinated coil scheduling includes:

processing, by an ACS of the acid rolling line, the coils whose processing route pass the acid rolling line using the acid rolling line according to the coil schedule in acid rolling line which is a part of the improved coordinated coil schedule, processing, by an ACS of the continuous annealing line, the coils whose processing route pass the continuous annealing line using the continuous annealing line according to the coil schedule in continuous annealing line which is a part of the improved coordinated coil schedule, processing, by an ACS of the hot galvanizing line, the coils whose processing route pass the hot galvanizing line using the hot galvanizing line according to the coil schedule in hot galvanizing line which is a part of the improved coordinated coil schedule, and processing, by an ACS of the hot aluminizing and galvanizing line, the coils whose processing route pass the hot aluminizing and galvanizing line using the hot aluminizing and galvanizing line according to the coil schedule in hot aluminizing and galvanizing line which is a part of the improved coordinated coil schedule, and wherein the coordinated coil scheduling improves the quality of the product by having reduced equipment adjustment and reduced abrasion penalties.

2. The method of claim 1, where the step 4, which improves in real time the initial coordinated coil schedule of multiple lines in the cold rolling area, comprises:

Step 4-1: initializing population of the coordinated coil schedule of multiple lines in the cold rolling area, and setting a given maximum iteration number and a given maximum iteration number without improvement, population of the coordinated coil schedule of multiple lines in the cold rolling area comprises the initial coordinated coil schedule of multiple lines in the cold rolling area, and other coil schedules in population of a coordinated coil schedule of multiple lines in the cold rolling area are generated randomly; and during the improvement, an adaptive value of each coordinated coil schedule is calculated according to a way for calculating an objective function of each coordinated coil schedule;

Step 4-2: judging whether the given maximum iteration number is reached, and if it is reached, then taking a schedule with a best adaptive value in current population as an optimal schedule, that is, the improved coordinated coil schedule of multiple lines in the cold rolling area, and if not, go to step 4-3;

Step 4-3: judging whether the given maximum iteration number without improvement is reached, and if it is reached, then taking the schedule with the best adaptive value in the current population as the optimal schedule, that is, the improved coordinated coil schedule of multiple lines in the cold rolling area, and if not, go to step 4-4;

Step 4-4: if the individual with the best adaptive value in the population is not updated, the maximum iteration number without improvement is added by 1;

Step 4-5: performing a mutation operation to the population;

Step 4-6: performing a crossover operation to the population;

Step 4-7: performing a selecting operation on the son generation in the population;

Step 4-8: calculating the adaptive value for each individual in the population, that is, calculating the objective function value of coordinated coil schedule of multiple lines in the cold rolling area corresponding to the current population;

Step 4-9: performing an increment operation to the current iteration number and updating the population, and then returning to step 4-2.

3. The method of claim 2, where:
the step 4-5, which performs a mutation operation to the population, comprises:

$$V_i^t = X_a^{t-1} \oplus F \otimes (X_b^{t-1} - X_c^{t-1})$$

$$\Delta_i^t = F \otimes (X_b^{t-1} - X_c^{t-1}) \Leftrightarrow \delta_{ij}^t = \begin{cases} x_{bj}^{t-1} - x_{cj}^{t-1} & \text{if } rand() < F \\ 0 & \text{otherwise} \end{cases}$$

-continued $$\Delta_i^t = (\delta_{i,0}^t, \delta_{i,1}^t, \dots, \delta_{i,n}^t)$$

$$V_i^t = X_a^{t-1} \oplus \Delta_i^t \Leftrightarrow v_{ij}^t = x_{aj}^{t-1} \oplus \delta_{ij}^t = \mathrm{mod}((x_{aj}^{t-1} + \delta_{ij}^t + n), n)$$

where $V_i^t$ is an ith variant chromosome in an tth generation, and $v_{ij}^t$ is a jth individual in $V_i^t$, and $X_a^{t-1}$, $X_b^{t-1}$ and $X_c^{t-1}$ are three different coordinated coil schedules of multiple lines in the cold rolling area in the population of a t−1th generation, $x_{ij}^{t-1}$ is a jth individual in $X_i^{t-1}$, F is a scaling factor, $\Delta_i^t$ is the ith intermediate variant chromosome in the mutation process of the tth generation, $\delta_{ij}^t$ is a jth individual in the intermediate variant chromosome $\Delta_i^t$ in the mutation process of the tth generation, and mod means modulus.

4. The method of claim 2, where:
the step 4-6, which performs the crossover operation to the population, comprises:
generating a trial chromosome $U_i^t$, i=1, 2, ..., PS, and $u_{ij}^t$ is an individual in the chromosome $U_i^t$;

$$u_{ij}^t = \begin{cases} v_{ij}^t & \text{if } rand() < CR \text{ or } j = D_j \\ x_{ij}^{t-1} & \text{otherwise} \end{cases}$$

where CR is in [0,1] which is a crossover parameter to ensure a variety of population, rand( ) generates a group of uniformly distributed random numbers between 0 and 1, $D_j$ is a number randomly selected from the set{1, 2, ..., n}, so as to guarantee that at least one dimension of $U_i^t$ is different from the ith coordinated coil schedule of multiple lines in the cold rolling area in the t−1th generation $X_i^{t-1}$;

CR is a self-updating number as the iteration number increases, and is updated as follows:

$$CR = CR_{min} + t * \frac{(CR_{max} - CR_{min})}{T}$$

where $CR_{min}$ is a minimum crossover probability, $CR_{max}$ is a maximum crossover probability, t is a current iteration number, and T is a maximum iteration number.

* * * * *